United States Patent [19]

Purdy et al.

[11] Patent Number: 4,682,189

[45] Date of Patent: Jul. 21, 1987

[54] REPRODUCTION OF CHARACTER IMAGES, PARTICULARLY FOR TYPESETTING APPARATUS

[76] Inventors: Haydn V. Purdy, Down Cottage, Down Place, Windsor, Berkshire; Ronald C. McIntosh, 17 Avenue Road, St. Albans, Hertfordshire, both of England

[21] Appl. No.: 903,864

[22] Filed: Sep. 2, 1986

Related U.S. Application Data

[63] Continuation of Ser. No. 563,535, Dec. 20, 1983, abandoned, which is a continuation of Ser. No. 436,202, Oct. 22, 1982, abandoned, which is a continuation of Ser. No. 189,962, Jan. 21, 1980, abandoned.

[30] Foreign Application Priority Data

May 31, 1978 [GB] United Kingdom ............... 25275/78
May 31, 1979 [GB] United Kingdom ........... PCT/GB79/00093

[51] Int. Cl.[4] ...................... G06F 15/626; G09G 1/14

[52] U.S. Cl. .................................... 364/523; 364/521; 364/900; 340/743; 340/747

[58] Field of Search ....................... 364/521, 523, 900; 340/706, 723, 727, 730, 739, 743, 747, 748, 750, 756

[56] References Cited

U.S. PATENT DOCUMENTS

| | | | |
|---|---|---|---|
| Re. 30,679 | 7/1981 | Evans et al. | 340/730 X |
| 3,581,302 | 5/1971 | Kolb et al. | 315/365 |
| 3,594,756 | 7/1971 | Granberg et al. | 340/720 |
| 3,675,230 | 7/1972 | Pitteway | 315/365 |
| 3,735,389 | 5/1973 | Tarczy-Hornoch | 340/720 |
| 3,809,868 | 5/1974 | Villalubos et al. | 340/720 |
| 3,930,251 | 12/1975 | Salava et al. | 364/523 |
| 3,936,664 | 2/1976 | Sato | 364/523 |
| 3,979,742 | 9/1976 | Kolb et al. | 340/739 |
| 4,029,947 | 6/1977 | Evans et al. | 364/521 |
| 4,115,863 | 9/1978 | Brown | 364/521 |
| 4,146,925 | 3/1979 | Green et al. | 364/521 |
| 4,195,338 | 3/1980 | Freeman | 340/739 X |

*Primary Examiner*—Errol A. Krass
*Assistant Examiner*—Joseph L. Dixon
*Attorney, Agent, or Firm*—Seidel, Gonda, Goldhammer & Abbott

[57] ABSTRACT

Character images are recreated and displayed on an incrementing plotter, such as a cathode ray tube (92), with a smoothly continuous outline and not as a discontinuous assembly of stripes or dots. A master curve, e.g. a spiral, is stored electronically in a memory (16) as a sequence of vector step instructions. The sequential outline is achieved by selecting appropriate curve sections from the memory to match the desired outline and re-orientating these curve sections so that successive sections join perfectly. The image can be displayed as designed, or one can add, subtract or modify elements of the character instantaneously. The system is especially suited for typesetting. For this, the system provides for infiling of the outline; for smoothing the curve; for thickening vertical and/or horizontal elements of a character; for vertically compressing zones of a character; and for tracing a secondary outline just inside the main outline.

20 Claims, 10 Drawing Figures

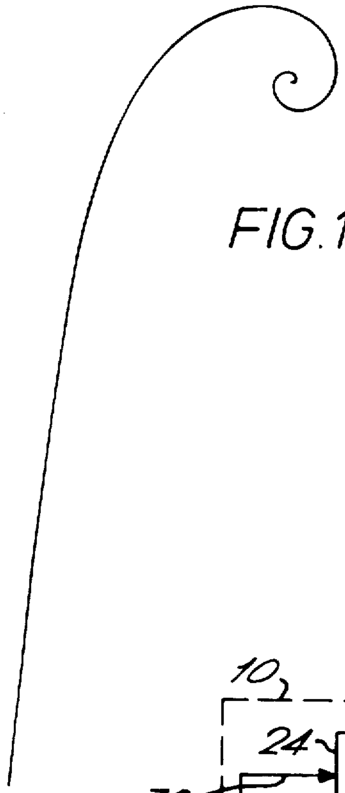
FIG.1.
FIG.2.
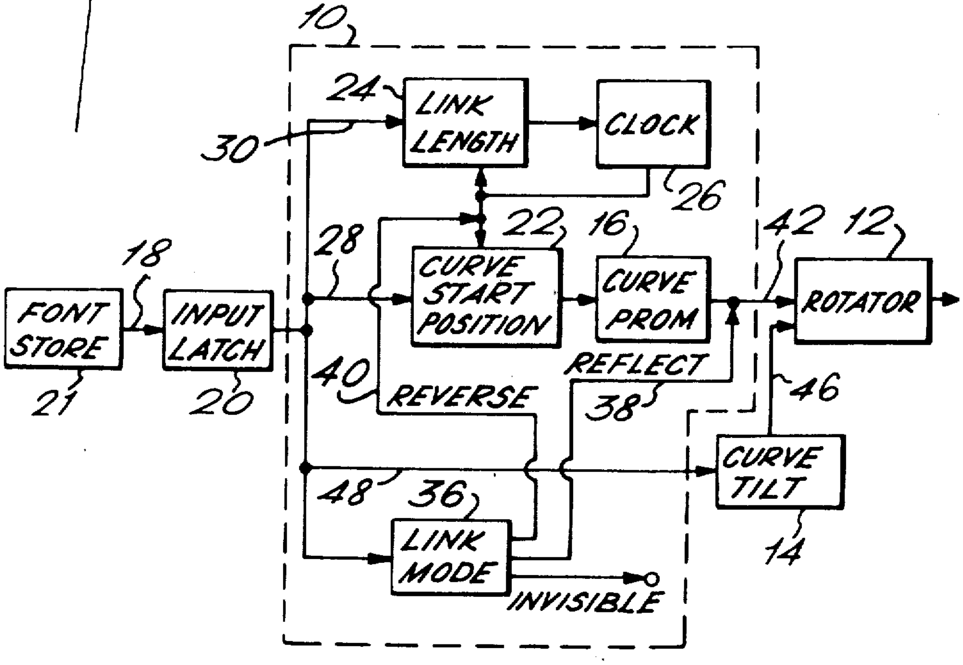

REPRODUCTION OF CHARACTER IMAGES, PARTICULARLY FOR TYPESETTING APPARATUS

This is a continuation of co-pending application Ser. No. 563,535 filed on Dec. 20, 1983 now abandoned which is a continuation of Ser. No. 436,202, filed Oct. 22, 1982 and now abandoned which is a continuation of Ser. No. 189,962, filed Jan 21, 1980 and now abandoned.

This invention relates generally to the reproduction of character images, either as visible images on an incrementing plotter, such as a cathode ray tube, or as a permanent record, such as on film. The requirement to reproduce character images, whether from a master character or from a new character design, is a particular problem with typesetting equipment. Although the present invention is particularly appropriate to typesetting apparatus, and will be described in detail hereinafter with reference to this particular application, it has application in its broader aspects to other fields of activity. The method of recreating character images in accordance with the present invention can be used in any situation where one wishes to reproduce a character outline or a solid character image, and will therefore find application in the fields of video display units, television, radar, etc.

Several machines are available which can reproduce typed characters in digitised form, based upon the scanning of a fine rectangular grid structure. In one known method, i.e. a skeletal method, of digitally expressing an image outline, the images are imposed upon an orthogonal grid of appropriate resolution and one notes where the outline exactly coincides with X and Y intersections. These positions are labelled as coordinate pairs in terms of counted elements, either from another pair of coordinates or from a datum point, such as a corner. The procedure can be visual, by physically counting the elemental lines drawn on the grid; it may be manual, by hand-tracing a stylus connected to an orthogonal measuring system; or it can be semi-automatic, by scanning the image in raster fashion, the end point of each slice being first located and then adjacent ones connected so as to constitute a linear edge-exploring sequence. In any mode of operation of this known method the process requires that it is only the relevant grid-coincident skeletal positions which need to be plotted, regardless of their separation.

In an alternative known method, which produces a total description record, a total sequence of adjacent intersections is noted, each one being as close as possible to the outline. One does not then need to establish absolute coordinates for each intersection, because a record of vector information between intersections will suffice.

However, regardless of the type of descriptive record which is made, digital drawing machines based upon these known methods typically trace out an image in orthogonal steps of equal size, acquiring extra interpolation instructions internally where necessary. Although a tracing based upon the step vector method may be acceptable for some purposes, it is a fact that orthogonal tracing steps at any resolution are still noticeable to a greater or lesser extent. With this total description record method one therefore has no alternative but to use a very fine grid. This is because any linking formula is handicapped by the fact that only a very tiny proportion of the grid intersections will fall exactly upon the outline, and even these few will not be specially identifiable. All the non-coinciding points will be up to half of an elemental distance in error. This type of record therefore suffers from excessive, randomly erroneous information, which prevents true restoration of the original image.

The skeletal method referred to above also has shortcomings. When reproducing an outline from more widely separated data points, the linking formula becomes complex. Purely predictive calculation is time-consuming and frequently ambiguous. It is possible for a nicely calculated, smoothed path linking several accurate data points still not to match the outline of the artist's design. This is particularly so where the designer has included a slight discontinuity of curve, which although it is barely perceptible in isolation, is a visible feature of the completed character. Any such subtlety which fails to coincide with the grid may therefore not be recorded at all.

Known typesetting machines based upon the use of these methods are not able to exploit the subtlety of traditional typography over its full design range in all its various sizes. In the known machines, re-sizing is usually accomplished by discarding information and also the available resolution. The known machines are also relatively inflexible. Although slanting and stretching of characters is possible, this often causes perceptible design distortion which has meant that it has not been possible to reproduce the original type face faithfully throughout the whole range of point sizes.

The present invention is based upon an appreciation of the following design factors:

1. The "outline" of a character defines most of the visible identity of a character, and defects are less tolerable upon the outline than within the outline;

2. A striped or dotted image, in any resolution, is improved when enclosed within a continuous line;

3. In any type face, the elements of the character must be thicker in the smaller sizes and their aspect ratio has to be widened;

4. When dealing with type faces, ascenders and descenders must all be re-proportioned within the image in the smaller point sizes.

It is an object of the present invention therefore to provide apparatus for and a method of reproducing character images so that the recreated image has a smoothly continuous outline, and not, as is conventional, an outline made up from a discontinuous assembly of adjacent stripes or dots.

It is another object of the invention to effect character reproduction by constructing and manipulating an extravagantly resolved outline, usually with subsequent automatic infilling of the outline.

The essence of the present invention lies in the way in which the extravagantly described outline of a character is constructed and manipulated. The desired sequential outline is achieved by selecting randomly addressable sections (hereinafter referred to as links) of a predetermined curve, and then re-orientating the links to the correct orientation for successive links to join perfectly into the desired sequential outline.

In accordance with the present invention there is provided a method of reproducing a character image as a visible image which comprises:

(a) storing sections of a predetermined curve as a series of vector step instructions in a randomly addressable memory;

(b) selecting appropriate ones of said stored curve sections to match the parameters of the outline of the character to be reproduced;

(c) orientating the individual selected sections to produce a modified sequence of step instructions; and, (d) using the modified step instructions to control an incrementing plotter to trace a finely resolved sequential character outline.

Also in accordance with the present invention there is provided apparatus for reproducing a character image as a visible image, the apparatus comprising a randomly addressable memory holding a sequential record of vector steps representative of incremental sections along the length of a predetermined curve, means to address the memory to generate a series of vector step instructions matched to the outline of the character to be reproduced, rotator means arranged to orientate the individual steps and produce a modified sequence of step instructions according to the desired re-orientation, and an incrementing plotter driven by said modified step instructions to trace a finely resolved sequential character outline.

By picking out extremely small sections of an appropriate predetermined curve, and re-orientating these links as necessary, one can create an infinite number of characters from just the one curve. The curve thus acts as an electronic template, enabling one to build up characters according to any desired design. As will be described later, the curve is preferably a spiral stored electronically as 16,384 individual steps, and the re-orientation or rotation process which is carried out on the selected links enables any one selected link to be placed in any of 4096 possible orientations. A complete set of links, processed by the electronic template and the rotator, is quite sufficient for any incrementing plotter, whether a cathode ray tube or a mechanical plotter, accurately to recreate the outline. All the links will be perfectly joined, each one starting where the preceding link terminates.

The present invention provides extra control of the image in ways which have previously been impossible in either real light or electronic typesetters, so as to keep it faithful to the best original designs throughout the size range.

The "recipe" for a character consists of a small set of curve links or sections, typically 35 links. The data information relevant to any such link includes its length, its angle, its starting point, and whether the link has to be reflected, reversed or invisible, as will be explained in more detail later. Coordinates are not generated after the first, as they are cumulative.

The image can be displayed as designed, i.e. based upon the data input information to the template, or one can add, subtract or modify elements of the character on the fly.

Although the character image reproduced from the processing of the data input by the electronic template and the rotator will produce a finely resolved sequential outline from the joined selected sections of the predetermined curve, for typographical purposes the image needs to be processed further. Other preferred features of the invention relate to such further processing of the image.

For typographical purposes it is necessary to fill in the outline, although this subsequent infilling does not need to be so elaborate as the outline and it can be achieved by the use of a striping beam which is typically fatter than the outlining spot if one is using a cathode ray tube. Preferably, the infilling circuit provides for the infilling beam to jump instantly over the white sections within each stripe. Between jumps, it writes at a constant speed.

According to a further preferred feature of the invention, provision is made for smoothing the curve which results from the rotator in order to eliminate tiny but "busy" excursions about the true curve.

According to another preferred feature of the invention, different elements of a character can be weighted in order to thicken certain vertical and/or horizontal elements of a character. This is particularly necessary in the case of small point sizes of type because small point sizes need more "body" so that the general character of any particular type face is identifiable throughout, even at small point sizes.

According to another preferred feature of the invention, provision is made for zone compression of a character; in other words, certain zones of a character, such as the ascenders and descenders in small point sizes of type, may need to be lengthened or reduced in order to compensate for certain optical effects.

According to yet another preferred feature of the invention, one ran trace a secondary outline of the character just inside the main outline, as a refined means of bridging from the fine outline to the relatively coarse infill constituent of the image.

These and other features of the invention will now be described in more detail in the following description of a preferred embodiment of the invention. Although, as mentiored above, the present invention is applicable to recreating the outline of a character in any field of activity where an image is produced by an incrementing plotter, the invention is hereinafter described with particular reference to a calligraphic typesetter. The calligraphic typesetter is particularly well adapted to take advantage of the great flexibility and control of the image which is achievable with the character reproduction procedures of the present invention.

In the drawings:

FIG. 1 is a representation of a curve usable as an electronic template for the present invention;

FIG. 2 is a block schematic diagram illustrating the basic parts of the character reproduction system of the present invention;

Figure 10:
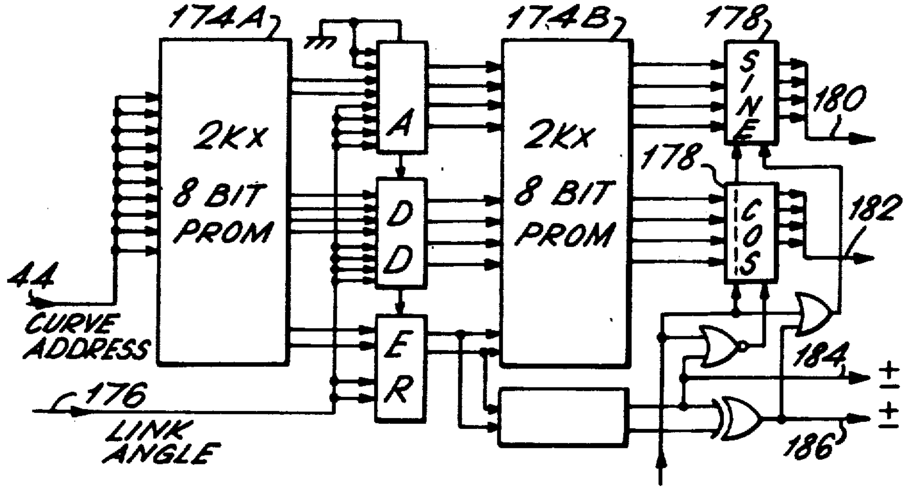
Figure 9:
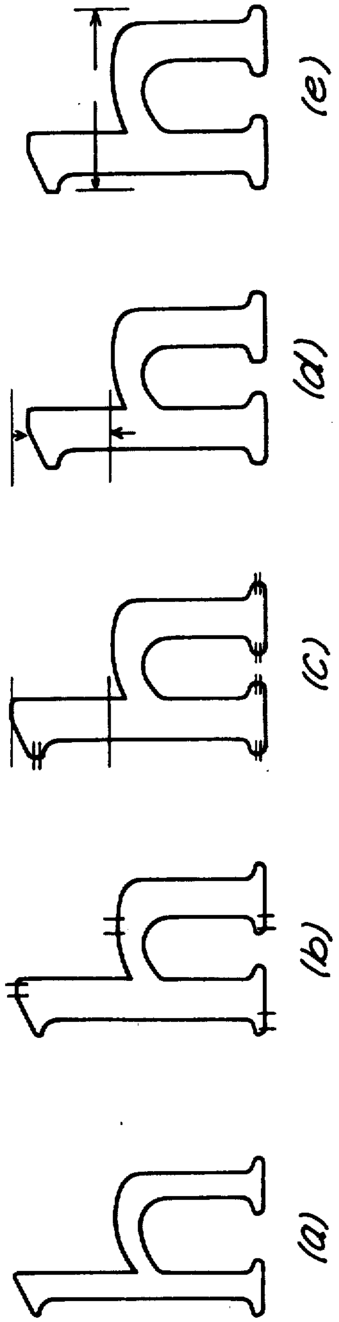

FIGS. 9(*a*)–9(*e*) illustrate zone compression and weighting applied to a character; and, FIG. 10 is a schematic circuit diagram of the sidestep (secondary outline) unit.

Before describing the apparatus and method of the present invention in detail, it is necessary to understand how the information which is needed for the recreation of the image is derived from the electronic template. A master curve is chosen from which every character can be created. An appropriate typographic curve is a two-convolution spiral, as shown in FIG. 1. The curve takes the form of a continuous smooth spiral starting approximately as a straight line but curving with ever-increasing velocity and terminating where it matches the tightest curvature encountered in typographic design. The curve is recorded electronically in a programmed read only memory (PROM) and is recorded in 16,384 steps. The memory is for example a 16K×2 bit, 10 MHz ROM. The 16,384 steps are available, on addressing the memory, as a rapid sequence of 4-vector (NES & W) very small step instructions. Any section, i.e. link, can be generated left-handed or right-handed. This reflection facility is achieved by transposition of East and West. Moreover, any section or link can be generated with increasing or decreasing curvature, in order to make the geometric curve proceed more steeply or less steeply. Curve reversal is required whenever the outline has to proceed with decreasing curvature instead of increasing curvature. An invisible link joins image parts separated by a white area.

The shallow end of the curve is virtually straight, but by selecting curve address "zero" the template record is by-passed and the sequence sticks on the first instruction, so as to cause an infinite sequence of steps along one axis only, i.e. North, without, as in all other cases, following the true course of the spiral.

The master curve is preferably chosen to conform to an unambiguous mathematical function which is applicable throughout its entire length. By choosing a curve based upon a mathematical function it is also easier to carry out the process of outline matching by computer methods.

As will be described in detail hereinafter, the curve template is used in conjunction with a rotator which will re-orientate a straight line or curve section in any of 4096 orientations. With the capability for any link to be reflected, i.e. to be left-handed, and for any link to be reversed, i.e. when the outline has to proceed with decreasing curvature instead of increasing curvature, there are therefore 16K variations of the 16K steps available, all at the full speed.

The "recipe" for any character, i.e. the data used as the input for recreating the outline of the character, consists of a small set of links selected from the curve shown in FIG. 1. A character would typically be described in terms of about 35 links or curve sections stored as words each of for example 40 bits. The description of each such link includes its length, its angle, its starting point on the curve, and also whether it has to be reflected, reversed or invisible (white). The first word for a character is a function describing the width of the character, the number of words in the set, etc.

FIG. 2 is a block schematic diagram of the heart of the character reproduction system of the present invention. The part of the system which comprises the electronic template is indicated within a broken line 10 in FIG. 2 and is shown in more detail in FIG. 3. The circuitry which makes up the rotator 12 and curve tilt circuit 14 shown in FIG. 2 is shown in more detail in FIG. 4.

Figure 3:
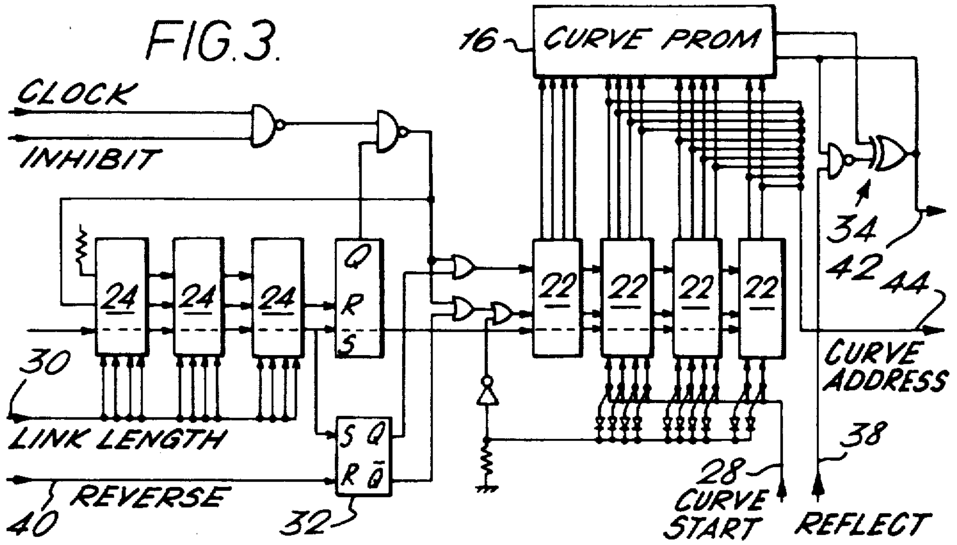
FIG. 3 is a schematic circuit diagram of the electronic template of FIG. 2.
Figure 4:
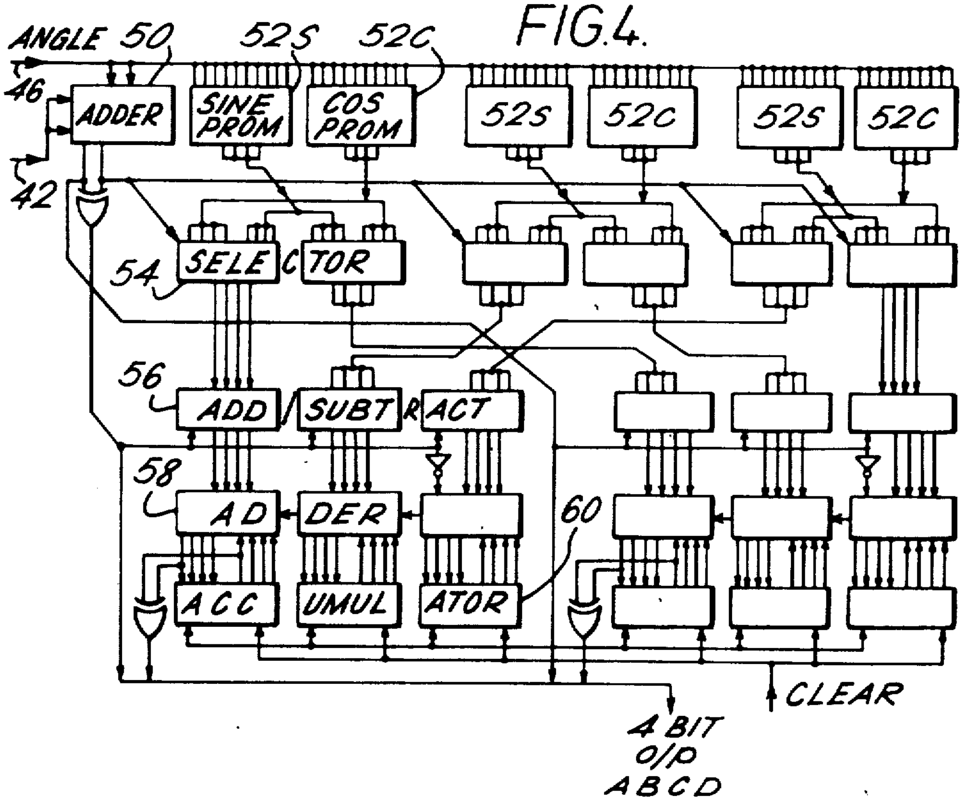
FIG. 4 is a schematic circuit diagram of the rotator of FIG. 2.

Referring to FIGS. 2 to 4, there is shown a curve PROM 16 which consists of a 16K×2 bit word PROM, the content of which is a sequential record of NESW steps, i.e. vector steps, around the curve shown in FIG. 1. In other words, the master template curve stored in the curve PROM 16 is a long sequence of NESW instructions which together describe a finely resolved curve in a fixed orientation. The data input to the reproduction system is fed in on line 18 through a latch 20 which permits the passage of all data for the execution of one link only. The data input on line 18 may be in the form of information retrieved from a punched paper tape carrying bit information which represents the parameters of the individual links which make up the character whose outline is to be recreated. At the input side of the latch 20 is a font store 21 which carries reserve alphabets, for example on a floppy disc. Justified text is presented to the font store from conventional equipment, such as magnetic or punched tape. The selection of characters from the font store is controlled by an associated computer.

The curve PROM 16 is provided with a preloadable up-down addressing counter 22. The counter 22 is a 14-stage counter, and preloading the counter determines a starting position along the curve. A "length" counter 24 is connected to the counter 22 in tandem, counter 24 being a 12-stage down-only counter. The counter 24 is preloadable and determines the length of the link. On preloading, it immediately counts down and stops at zero. Because of its tandem connection with counter 22, it determines the number of addresses that are read from the curve PROM 16. A clock 26 determines the speed at which the length counter 24 runs down. The clock 26 also acts as a general system clock. The data from the single link latch 20 is fed to the up/down counter 22 over line 28, and the data input to the length counter 24 is fed over line 30.

The starting position is established by preloading the addressing counter 22, whereupon a tracing sequence is generated by applying the system clock 26 to either the up or the down input of counter 22. Since the curve is essentially a spiral, an up count will produce a decreasing curve, and a down count will result in an increasing one, from wherever it starts. Additionally, there are three single bit latches. One of these, which includes a flip-flop 32 (FIG. 3), makes the addressing counter 22 proceed either up or down, thus providing for reversal of the link, effectively making the generated curve proceed more steeply or less steeply. A second single bit latch is indicated at 34 in FIG. 3 and is effectively a switch which transposes the East and West output wires from the PROM 16, thus "reflecting" the curve. The third latch is associated with the infill circuit shown at 78 in FIG. 5 and functions to make a link invisible. These three latches are indicated jointly in FIG. 2 by the block 36. The bit information to effect reflection is shown as passing to the output of the curve PROM 16 over line 38, and the bit information to effect reversal of the curve is shown as passing to the input side of the addressing counter 22 over line 40. As will be seen from FIG. 3, the inputs to the master curve template are:

1. Length of required link (12 bit)
2. Starting point (10 bit)
3. Direction (2 bit)
4. System clock.

By preloading the appropriate bits into the template module, together with a suitable clock to operate its counters, a clearly defined section of the curve will emerge as a two bit output on line 42. The output is a two-wire encoded sequence representing North, South, East, West discrete vector steps of fixed unit length. As will be seen from FIG. 3, the master curve template provides another output on line 44 representing the curve address and for use in tracing a secondary outline inside the primary outline, as will be described later in conjunction with FIG. 10.

However, the clearly defined sections of curve which emerge from the curve PROM 16 on line 42 will each have a fixed orientation, i.e. the orientation in which those sections of the curve were originally drawn. In general, and certainly in the case of typography, the curve sections or links need to be re-orientated in order to match outlines. For this, a different set of NSEW instructions has to be created. This re-orientation is achieved using the original grid structure and is implemented "on the fly". The re-orientation is effected by the rotator 12 under the control of data input on line 46 from curve tilt circuit 14 which latches the angle of the link for the duration of the link and which itself receives data input on line 48 via the input latch 20. The versatility of the master curve is grcatly enhanced by this rotation, accomplished on the fly.

With particular reference to FIG. 4, the N, S, E and W direction instructions from the curve memory 16 on line 42 are cross-coupled, so that each one drives a specific second one on the other axis. Both these outputs are digitally attenuated to a certain proportion of their maximum value. These proportions are fixed, and applied for the duration of the linking process; they are the sine and cosine ratios relating to the angle of re-orientation. The rotator comprises sine and cosine PROMS 52S and 52C which store sine and cosine values in binary form and which thus constitute a sine/cosine ROM look-up table. The input side of the sine and cosine PROMS is connected to line 46 which carries the angle data relevant to each link. The sine and cosine PROMs simultaneously receive from line 46 in respect of each link a 10-bit number representing an angle between 0° and 89°. The sine and cosine PROMs provide as an output an appropriate pair of 11-bit ratios, each representing a binary fraction less than 1, except for the special case of 0°, where the cosine PROM outputs a special "12th" bit, all other bits being low.

The two most significant bits of the 12-bit angle address are not applied to the PROMs, but serve to add 0, 1, 2 or 3 to the encoded N S E W step instructions. This addition to the code changes the North directly into East, South or West respectively, and the East, South and West are similarly transposed according to whether 0, 1, 2 or 3 is added. The addition of these bits from the angle address to the incoming encoded signals on line 42 is effected in an adder 50. The tilting angle is measured clockwise, and 12 binary bits represent a full rotation.

The principle on which the rotator is based is that for each input step, in any direction, two smaller steps are generated, at right-angles to one another. The size of these two generated steps is determined by the two 11-bit numbers extracted from the respective sine/cosine PROMs.

Only four possible step instructions are presented to the rotator. These are N, E, S or W. Each step initiates one or other of the functions listed below;

1. North: add cosine to East and add sine to North
2. East: add sine to East and subtract cosine from North
3. South: subtract cosine from East and subtract sine from North
4. West: subtract sine from East and add cosine to North.

The output from the sine/cosine PROMs is fed to a selector 54 which selects between the outputs from the sine and cosine PROMs and has a connection to one output from the adder 50. The outputs from the selector 54 are taken to add/subtract circuits 56 which add or subtract the sine and cosine values in accordance with the table given above. Connected to the output side of circuits 56 are adders 58 connected to a pair of 12-bit latches or accumulators 60. The 12 bits of the latch 60 define 4096 possible orientations, one of which must be included in each link instruction. The accumulators 60 to which the 11-bit ratios are added in parallel hold a total of only one step, and no carry or borrow output is provided. If the curve section is not to be rotated, the angle of tilt will be 0° and the PROMs 52S, 52C will indicate (in 12 and 11-bit binary) 1 and 0 respectively. Thus, despite the obligatory two-axis operation, one axis will constantly overflow in exact synchronism with the input, while the other will accumulate zeroes and thus do nothing. These signals are substituted for the original input steps and constitute the output of the unit (in 12 and 11-bit binary).

In summary therefore, the rotator accepts any sequence of four-vector instructions, and by consulting the high resolution sine and cosine tables stored in the PROMs, plus some concurrent and simultaneous calculations, creates a new 4-bit NSEW output of vector steps which describes the sequence in a new orientation. The rotator thus generates a modified set of single step increments appropriate to the desired orientation of each link.

A complete set of links as processed by the master curve template and the rotator is sufficient for any incrementing plotter, either mechanical or cathode ray tube, accurately to recreate the character outline. The rotated link stepping instructions can be used to control a cathode ray tube display, so that its steered beam traces out a character outline. All the links will be perfectly joined, each one starting where another finishes, but for typographical purposes the image has to be processed further.

Figure 5:
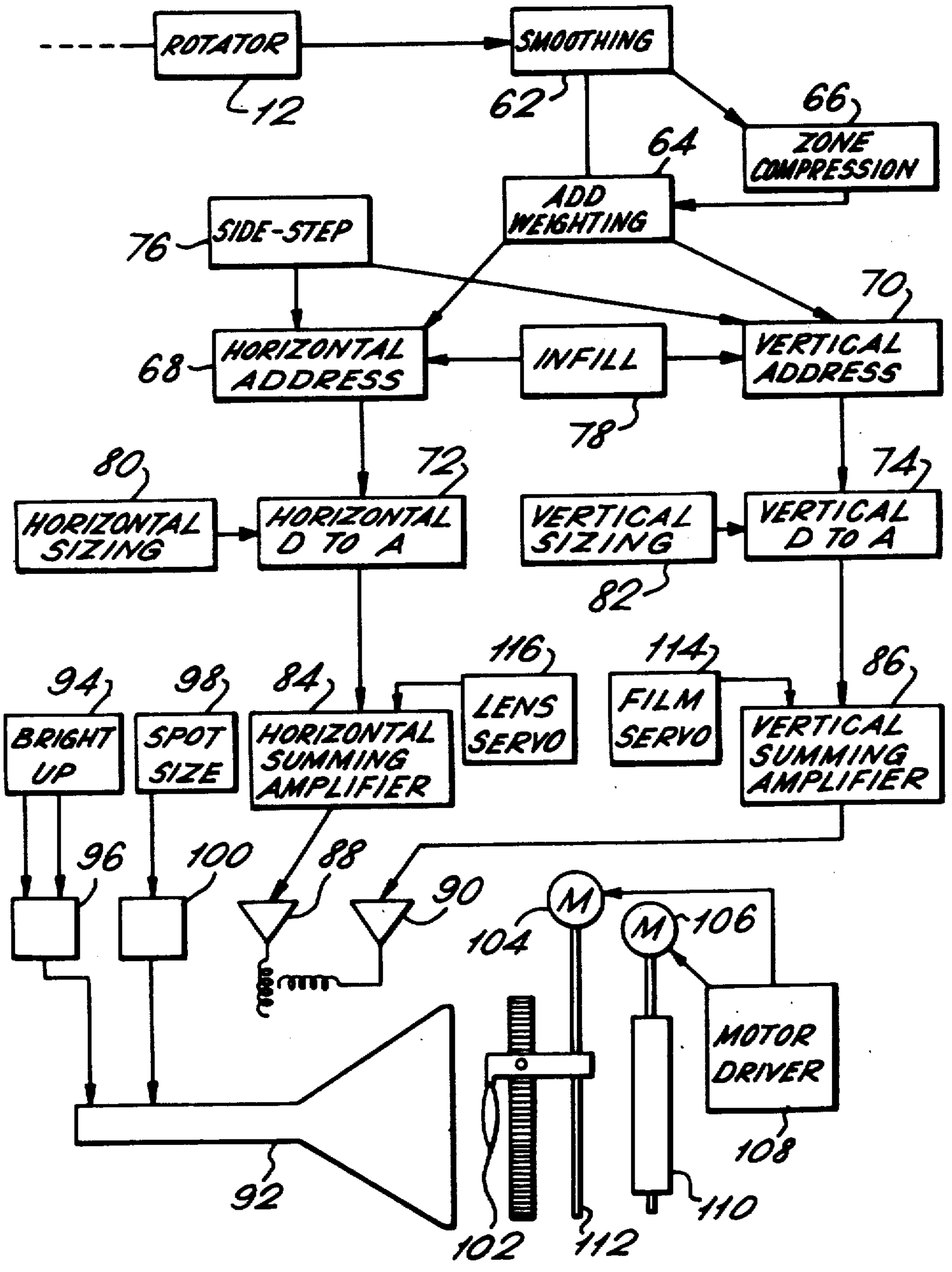
FIG. 5 is a block diagram illustrating the addition of various preferred features to the system of FIG. 2.

FIG. 5 is a block diagram which illustrates certain additional processing steps which may be carried out. A brief description will first be given of the block diagram shown in FIG. 5, followed by a more detailed description of certain ones of the individual process steps. The output signal from the rotator 12 is fed to a smoothing circuit 62 which translates the 4-vector steps to 8-vector steps. Connected to the output of the smoothing circuit 62 is a weighting circuit 64 which adds weight to small point sizes of type by adding predetermined "flats" to horizontal and/or vertical elements of the character outline. Typically, small point sizes need more "body weight", and their vertical and horizontal strokes may need different amounts of thickening.

A zone compression circuit 66 is connected between the smoothing circuit 62 and the weighting circuit 64. If the image has to be displayed in a small point size, certain optical effects need to be compensated. One such effect calls for a reduction in the length of both the ascenders and the descenders, sometimes differentially. The zone compression circuit digitally modifies the image both above an adjustable X-height and/or below a base line.

The output from the weighting circuit 64 is taken both to a horizontal addressing circuit 68 and to a vertical addressing circuit 70. The horizontal addressing circuit 68 provides serial or parallel input addressing circuits for a horizontal digital-to-analogue converter 72, and the vertical addressing circuit 70 comprises serial or parallel input addressing circuits for a vertical digital-to-analogue converter 74. The converters 72 and 74 effect digital-to-analogue conversion of the horizontal and vertical deflection signals respectively. The addressing circuits 68 and 70 also receive input from a sidestep circuit 76. This provides a secondary outline just inside the primary outline of the character in order to close gaps left between the fine primary outline and the relatively coarse infill pattern. The addressing circuits 68 and 70 also receive input from an infill circuit 78. Normally, an image outline will need to be filled in for display. The infill circuit 78 therefore stores and redistributes data for a coarse pattern of vertical stripes to fill in the character which has already been outlined Connected to the horizontal and vertical digital-to-analogue converters 72 and 74 respectively are horizontal and vertical sizing circuits 80 and 82 respectively. The horizontal sizing circuit 80 is preloaded to give a required point size and horizontal anamorphising, and the vertical sizing circuit 82 is similarly preloaded to give the required point size and vertical anamorphising. By means of these circuits, both axes are subject to a final and independent degree of stretching. The size of the image is digitally attenuated, separately for each axis, which means that the aspect ratio can be altered to compensate for the weighting of a character or for the effects produced by the zone compression circuit 66. The circuits can also be used merely to stretch a character aesthetically in the smaller point sizes in order to improve their optical quality.

The output from the horizontal converter 72 is fed to a horizontal summing amplifier 84, and, similarly, the output from the vertical converter 74 is fed to a vertical summing amplifier 86. The respective outputs from these amplifiers 84,86 are fed to separate horizontal and vertical scan drivers 88 and 90 respectively for a cathode ray tube 92. Associated with the cathode ray tube 92 is a spot brightness circuit 94. This circuit combines the pulses which provide the cathode ray tube bright-up to the necessary exposure level. Brightness compensation for the tube is provided because the image point size is electrically attenuated, and the system clock remains constant for any point size. Preferably, the spot brightness control takes the form of pulse width modulation of the bright-up signal. Alternatively, one can provide for a 1 to 1.4 fixed ratio brightness change, in order to accommodate the two step lengths, i.e. "on axis" and "diagonal". The output from the circuit 94 is fed to a converter 96 which converts digital signals to bright-up level; its output is fed to the tube 92.

Also associated with the cathode ray tube 92 is a spot size circuit 98. This circuit enables one to achieve two spot sizes for the tracing beam by defocussing the beam. This is accomplished by modulation of the focus electrode, accompanied by a matching increase in the beam current. In this way one can achieve a fine spot for the outline tracing, and a coarse spot for the infill pattern. The output from the spot size circuit 98 is fed through a converter 100 which converts the digital signals to the focus voltage.

Associated with the cathode ray tube, for phototypesetting purposes, is a lens and film combination so that the CRT display can be projected on to film to provide a permanent record. A lens 102 is positioned in front of the CRT 92. Both the lens and the film are arranged to be displaceable in fine increments. For this purpose a lens stepping motor 104 and a film stepping motor 106 are provided, both being driven from a common power source 108. The motors 104 and 106 are preferably 400 step per revolution stepping motors. The film drive is by means of a rubber roller 110 which is driven directly from the film motor shaft. Each step is arranged to feed the film by a small incremental amount. The lens traverse is also a direct drive mechanism via a ball-screw 112 connected to the stepping motor 104. In addition to the mechanical stepping motion, the displayed image on the film can be displaced electronically to provide finer incremental displacement. This is achieved by means of a film servo 114 which is loaded with a film shift signal to supplement the coarse shift of the stepping motor 106 by effecting small image movements. The output from the film servo 114 is fed through the vertical summing amplifier 86 to the vertical scan driver 90 of the CRT.

Similarly, although the basic displacement of successive characters is accomplished by means of the lens 102 which is made to traverse the film incrementally by a distance appropriate to the width of the characters, and which pauses during the link exposing process, a similar electronic fine adjustment is provided by means of a lens servo 116 which is loaded with a lens movement signal to supplement the coarse shift of the lens stepping motor 104 by effecting small image movements. The output from the lens servo 116 is fed through the horizontal summing amplifier 84 to the horizontal scan driver 88 for the CRT.

Certain of the individual processing circuits referred to briefly above in connection with FIG. 5 will now be described in more detail.

Curve smoothing

Figure 6:
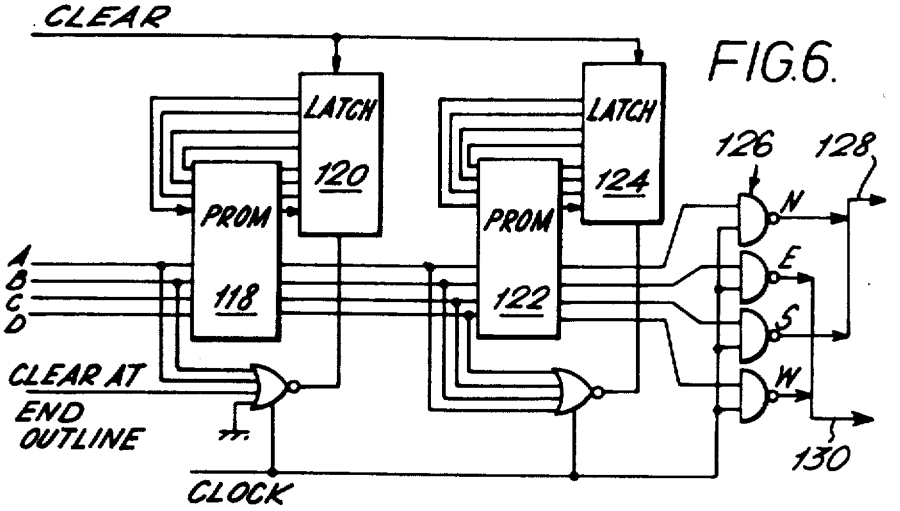
FIG. 6 is a schematic circuit diagram of the curve smoother.

The basic template curve is recorded as a long sequence of 4-vector instructions. The rotation of this sequence in the rotator introduces redundant swings as the arithmetic tries to keep the tilted version on course. This is because the curve, as recorded, is full of sharp angles. This is what the rotator has to work on however, hence the redundant activity. Diagonal steps are permitted from this moment on, and such steps as the rotator does generate deviate less than one step from true. The simultaneous processing of the image in the rotator creates tiny but "busy" excursions about the true curve and it is these excursions which the curve smoother eliminates. A suitable curve smoothing circuit is shown in FIG. 6. The positive logic signals from the rotator 12 are indicated as a four-wire input A, B, C, D. These are fed to a first PROM 118 which has a "D"-type latch 120 associated with it. The output from the first PROM 118 is fed to a second PROM 122 which similarly has a latch 124 associated with it. At the output side of the second PROM 122 are respective N E S W NANO gates 126.

The action of the first PROM 118 is to recognise and eliminate redundant excursions, whilst the second PROM 122 ensures that the final curve, whether rotated or not, is generated in the more desirable 8-rotated vector mode. In other words, the second PROM 122 takes out detracting diagonals, whereas the first PROM 118 puts improving diagonals back. Both PROMs are addressed similarly, that is to say the full address is made up of half current information and half "looked-up" data derived from a successive pair of inputs. Four of each PROM's 8 inputs are automatically entered from its own outputs, and represent an element of a preceding step. Two steps are therefore always considered simultaneously. The first PROM 118 is a little more full, because it also translates the A, B, C, D outputs from the rotator into the simpler N S E W conditions. The first PROM 118 removes the opposing vector components of adjacent step instructions. These are present because the rotator tilts a stepped curve which straddles the desired one. The second PROM 122 removes every right-angled step, whether grid-oriented or diagonal to it. The instructions leaving the second PROM 122 are therefore smoother, i.e. they more tightly straddle the desired curve, than those stored originally in the template, whether they are rotated or not.

The curve smoothing circuit operates according to the following table:

| | | | | | |
|---|---|---|---|---|---|
| $\underline{A}$: step North or South | | | $\underline{C}$: step East or West | | |
| A: no step | | | C: no step | | |
| B: North | } | unless disabled by A | D: East | } | unless disabled by $\overline{C}$ |
| $\overline{B}$: South | | | $\overline{D}$: West | | |

The North and South outputs from the curve smoothing circuit on line 128 are fed to the zone compression circuit 66, and the East and West outputs on line 130 are taken directly to the weighting circuit 64.

Zone Compression

Figure 7:
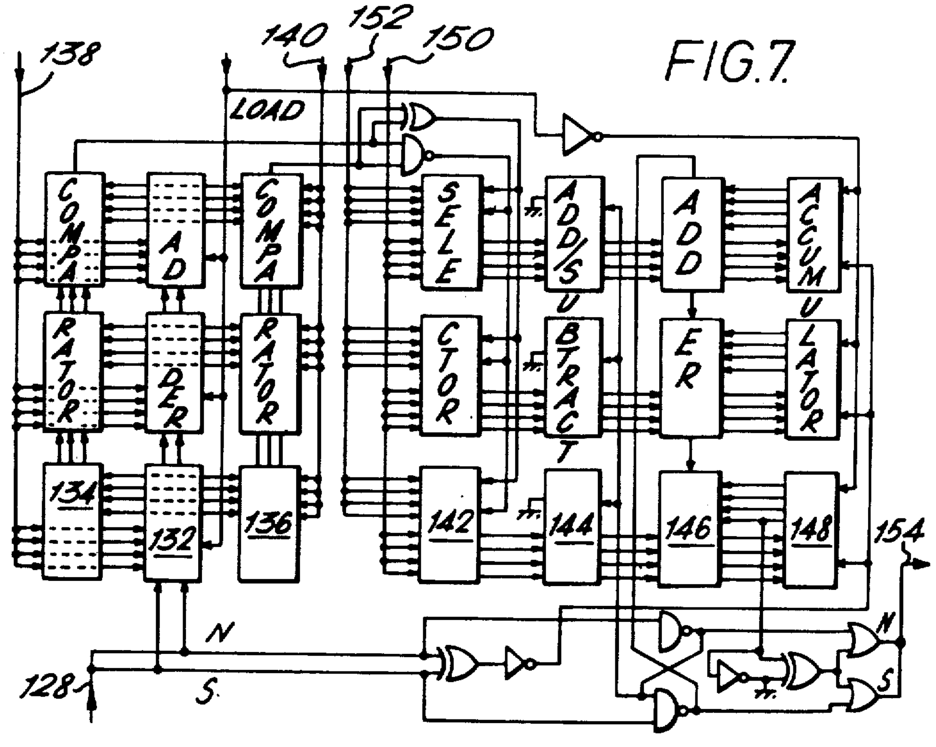
FIG. 7 is a schematic circuit diagram of the zone compression unit.

The zone compression circuit is shown in FIG. 7. The purpose of the zone compression circuit is to compress vertically certain zones of the image outline, e.g. above a predefined X-height and also below the baseline. The effect which is most desirable will differ from typeface to typeface, and does not need to be applied linearly throughout the point sizes. In essence, the zone compression circuit accomplishes the vertical compression by monitoring the vertical digital-to-analogue addressing accumulator, detecting when the X-height and baseline levels are being overtaken, and removing some of the incoming serial inputs appropriately.

The incoming North/South data on line 128 from the smoothing circuit is fed to a digital adder unit 132. A first digital comparator 134 receives data relating to the baseline on line 138, and a second digital comparator 136 receives information relating to the X-height on line 140. The digital comparators indicate when the (vertical D to A) addressing accumulator is below the baseline or above an adjustable X-height, and enable the adder unit 132 accordingly. The other part of the zone compression circuit is similar to that used in the rotator, comprising a selector 142, an add/subtract circuit 144, an adder 146 and an accumulator 148. Data relevant to the amount or percentage of compression is supplied on line 150 for a first zone A and on line 152 for a second zone C. In a manner similar to the technique used in the rotator, a selectable 11-bit binary fraction (less than 1) is added or subtracted to or from the accumulator which overflows at 1 and underflows at 0. The input signals, whilst within a particular zone, are thus attenuated by the preset fraction, the overflow or underflow being substituted for the step instruction. The output from the accumulator 148 is fed back into a gate circuit which also takes the input data from line 128, producing a modified NS output on line 154 which is fed to the weighting circuit 64.

Weighting circuit

Figure 8:
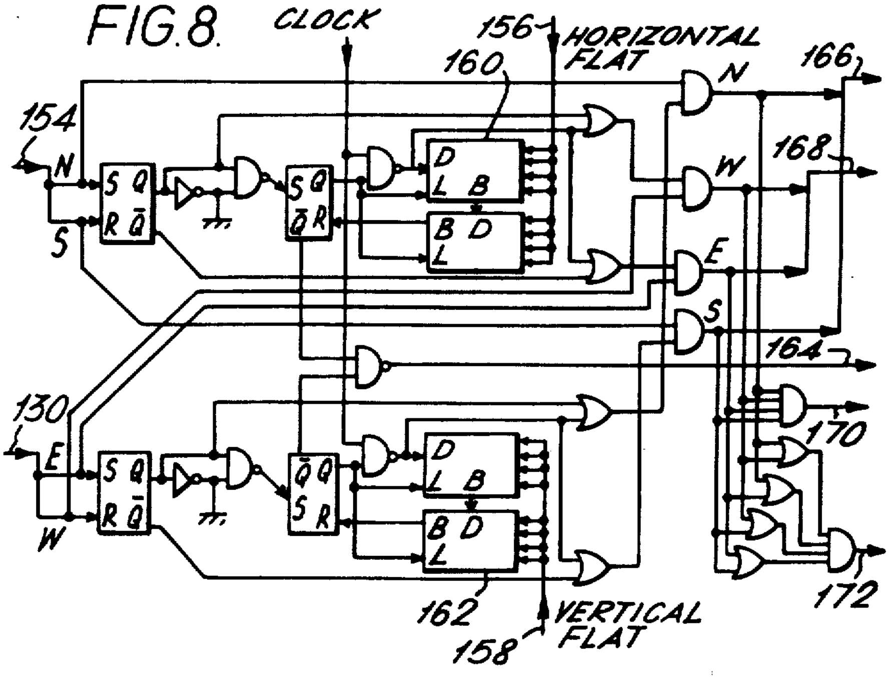
FIG. 8 is a schematic circuit diagram of the weighting unit.

The weighting circuit 64 which is shown in FIG. 8 serves to "embolden" the outline image by adding "flats". In other words, the proportion of black to white within the image may be increased, according to a predefined rule, both vertically and horizontally, in each case by an independent amount. The emboldening is accomplished by detecting the points of reversal on each axis, and inserting an additional short preset sequence of steps along the other axis at such points. In effect, this adds an axial flat to the design. The vertical emboldenment will typically be less than the horizontal, because of traditional typographic design. This emboldening effect is useful when displaying images in small point sizes, in order to conform to optical adjustments previously found to improve legibility.

FIG. 9 shows an example of adding flats, and also of zone compression in the upper zone. In FIG. 9(*a*) the optimum shape of the particular character is shown, designed for large size reproduction. In FIG. 9(*b*) the uprights have been made thicker and the bowl made thinner, by a single formula. The small radii have not been coarsened, and flats are inserted only where curves change, from North to South. In FIG. 9(*c*) more (and smaller) flats have been inserted in order to broaden the outline vertically. The small radii are still retained. It should be noted that use of a bigger drawing spot or pen would have destroyed the small radii and the resolution. In FIG. 9(*d*), which indicates the zone compression in the upper zone, everything above the X-height has been made shorter. In FIG. 9(*e*) the width has been evenly anamorphised, including the bowl and the uprights. The image is now a "new design", more suitable for smaller point size reproduction.

Thickening an image naturally changes its outline. It is desirable to accomplish this without sacrificing any of the essential character of the image. This resides partly in the corners and partly in the curves. The insertion of flats in accordance with the preferred feature of the present invention leaves corners and small radii intact, and provides minimal disturbance to curves.

Referring now more specifically to FIG. 8, this shows the input on line 154 from the zone compression circuit 66 and the input on line 130 from the smoothing circuit 62. Data relevant to the desired horizontal flats is fed into the circuit on line 156, and data relevant to the desired vertical flats to be introduced is fed into the circuit on line 158. The horizontal flat data is fed into a counter 160 and the vertical flat data into a counter 162. The gating circuitry is such that the unit senses a "reversal" on either axis, stops further input data, and initiates a small, fixed value "flat" (burst of X or Y steps) to the other axis, to its right. The first N to S reversal adds a West flat; the first S to N reversal adds an East flat; the first W to E reversal adds a South flat; and the first E to W reversal adds a North flat. Outputs pass inputs unmodified, but when inputs are halted by a "reversal" a selected one will pass a short burst of steps programmed to suit each axis.

The gated output on line 164 inhibits the smoothing circuit from providing any further inputs to the weighting circuit while the weighting circuit is adding flats. The output on line 166 is a two-wire North/South output to the vertical address circuit 70. The output on line 168 is a two-wire East/West output to both the horizontal address circuit 68 and the infill circuit 78. The weighting circuit also provides outputs on lines 170 and 172 to the bright-up circuit 94 for the CRT, the output on line 170 constituting an on/off signal and the output on line 172 controlling the bright-up between the two brightness levels which are in a fixed ratio, e.g. 1 to 1.4.

Infill

The data record produced by the present invention is outline orientated. This facilitates amendment, and reflects the fact that most of the critical information about a typographical image resides in its outline. Nevertheless, in most circumstances, particularly with typographical images, the image is not complete until it is "filled in". The outline is drawn as a continuous line, as described above. However, the infill is not, and takes the form of a number of discontinuous adjacent and parallel stripes, set out in a raster fashion. The infill is an automatic subsidiary function of the apparatus. Although the outline is finely resolved, the subsequent filling in can incorporate as few or as many stripes as are judged necessary. The striping beam, which is typically fatter than the outlining beam, is in general not turned off during its cycle, because of an ability which it has to "jump" instantly over the white sections within each line scan. Between jumps, it writes at a constant speed. Thus, the infilling of the hollow outline is implemented by drawing a sequence of vertical stripes, whose terminations fall on or just inside the outline of the character. The drawing excursions during this process far exceed the outlining excursion, and in order to reduce the time consumed by exploring white areas with a blanked off trace, the trace is made to "jump over" white areas. This therefore requires that the infill circuit should employ a random access facility.

The infill logic records the boundaries of the outline on a matrix and this is subsequently re-scanned between the stored boundaries in raster fashion. Concurrent with the outlining operation, the orthogonal digital deflection is monitored, and directly addresses the rows and columns of a large random access memory (RAM). A pattern of logical 1's can thus be set up in the RAM, corresponding to the orthogonal excursion of the outline. Immediately the outline is complete, the columns are read sequentially. The infilling RAM preferably consists of 4K×12 bit words. The infilling procedure takes place immediately after the outline tracing, and resembles a TV raster, except that the stripes are vertical. However, the non-image areas are not scanned, but jumped over, because of the random access capability. This reading action is coupled, using the digital-to-analogue converters 72 and 74 to the cathode ray tube driver circuits 88 and 90, so that the raster will appear in synchronism. In the infilling procedure, the trace is first placed at the beginning of a vertical stripe, or stripe segment, and is made to ascend by applying the system clock to a counter until its accumulated contents become equal to the next height in the stored record, at which moment a fresh starting coordinate is presented by the memory and incremented as before, until the stripe is completed and a fresh adjacent one is selected. By concurrently amending the heights by some constant factor, the stripes can be made to fall inside the outline. The drawing of each stripe takes about 50 microseconds.

Sidestep

FIG. 10 shows details of the side-step circuit which produces a secondary outline to be traced just inside the main outline as a means of bridging from fine to coarse constituents of the image. The side-step circuit forces the tracing beam to keep a measured distance from the recorded course and at 90° to its tangent. The side-step keeps unambiguously within the image, because it is so defined that the tracing mechanism always moves so that there is "image" on its right hand.

Connected in tandem with the curve PROM 16 (FIG. 3) is another PROM which has absolute (8 bit) angles associated with the general (not stepped) direction of the curve at that address. The side-step module can establish a constant modification which, when applied to the main instruction sequence, makes a second tracing fall just inside the first one.

The side-step circuit includes an auxiliary PROM, describing the same curve, and organised not as 16K×2 but as two sections 174A and 174B each of 2K×8 bits. Stored in successive addresses is the absolute angle (8 bits) that the master curve makes with the vertical under the control of the master PROM 16, to which the auxiliary PROM 174A, 174B is connected in tandem. The auxiliary PROM 174A, 174B has fewer addresses, so each angle is retained for a few steps. The tilt angle information which comes from the curve tilt circuit 14 (FIG. 2) is fed into the side-step module on line 176 and is added to the angle found in the auxiliary PROM at that address. The combined angle is applied to a pair of sine/cosine PROMs 178. One PROM 178 produces a 4-bit digital output on line 180 which constitutes vertical side-step and which is added to or subtracted from the contents of the main digital-to-analogue addressing counter in the vertical address circuit 70 (FIG. 5), thus displacing its output. The other PROM 178 produces a 4-bit digital output on line 182 which constitutes horizontal side-step and which is added to or subtracted from the contents of the main digital-to-analogue addressing counter in the horizontal address circuit 68 (FIG. 5), thus displacing its output. The side-step circuit also produces single bit outputs on lines 184 and 186 which constitute plus or minus polarity signals for the horizontal and vertical respectively, and which constitute add/subtract instructions to the addressing counters in the horizontal and vertical address circuits 68 and 70. The displacement of the counter outputs creates a fixed distance side-step at a precise right-angle to the original line. A larger drawing spot may be used for the side-step trace in order to improve economy and speed of execution, but without affecting the fineness of the primary outline.

In the foregoing description the invention has been described in terms of its application to a calligraphic typesetter. In normal use, the machine will produce characters from data supplied from the font store under the control of an associated computer which will determine character selection and size. However, the character reproduction system can also be used to produce a master record of a new design of character for entry into the font store for subsequent retrieval. This can be effected by projecting an image of the new design of character on to the screen of the cathode ray tube and then effectively tracing the outline of the new character by adjustment of the master curve template controls and of the rotator. As the outline of the desired character is built up so the data can be written by suitable means to form a record which can be put on to tape, for example, for entry into the font store. In this way one can design totally new characters and provide a permanent reproducible record which the apparatus of the present invention will then reproduce precisely.

Although the invention has been described above in terms of the reproduction of a single character, it is equally applicable to a plurality of characters, such as a line of type.

Additionally, although the CRT has been shown associated with a mechanical shift mechanism for film and lens, this can be dispensed with for certain applications.

Moreover, although the reproduction system of the present invention is primarily designed to recreate a smooth outline which is then filled in, for proofing or less critical work the output which drives the plotter to trace the outline can be dispensed with and just the infill scan is displayed, using the technique described above. For proofing work the solid infill produced at high speed is both adequate and desirable, the outline trace then being brought in for the final display.

It should be noted that an important application for the invisible link, already described, is found in reproduction of characters which are made up from a number of closely spaced segments (separate or overlapping) each describable as a closed loop, a major example being Chinese symbols. Each invisible link may be originated at a common datum point. Each link may then be digitally expanded to provide a separate control means for acceptably distancing the various segments when reproduced in small point sizes, and thus enhancing legibility.

What is claimed is:

1. Apparatus for reproducing a character as a visible image, comprising a randomly addressable memory holding a sequential record of vector steps representative of incremental sections along the length of a predetermined curve, means to address the memory and generate a series of vector step instructions matched to the outline of the character to be reproduced, rotator means for orientating the individual steps and producing a modified sequence of step instructions according to the desired re-orientation, said rotator means further comprising means to generate from each of the individual vector step instructions two steps at right angles to each other, the size of these generated steps being determined by sine and cosine functions of the angle through which the section is to be rotated; and an incrementing plotter driven by said modified step instruction to trace a finely resolved sequential character outline.

2. Apparatus as claimed in claim 1, in which the rotator means includes sine and cosine PROMs which are addressed by a bit number representative of the angle through which a section is to be rotated and which produce two bit numbers which determine the sizes of said two steps, and an adder circuit which receives the vector step instructions from the memory and also two bits to effect transposition of any given vector step through 90°, 180° or 270°.

3. Apparatus as claimed in claim 1 in which said means to address the memory comprises an up/down counter preloaded to determine the starting position along the curve, a down-only counter is being connected in tandem with said counter and is preloaded to determine the length of a given section, and means are provided to effect reflection and reversal of a given curve section.

4. Apparatus as claimed in claim 1 for the typesetting of typographic images, wherein the plotter is a cathode ray tube, and wherein means are provided for obtaining a photographic record of displayed images, and a weighting circuit is arranged to add vertical or horizontal steps to parts of the image outline.

5. Apparatus as claimed in claim 1 for the typesetting of typographic images, wherein the plotter is a cathode ray tube, and wherein means are provided for obtaining a photographic record of displayed images, and a zone compression circuit is connected to the output of the rotator means and to compress vertically selected zones of an image outline.

6. Apparatus as claimed in claim 1 which includes a circuit for generating a secondary outline just inside the character outline, said circuit comprising an auxiliary PROM connected in tandem with said memory and storing the same curve information.

7. Apparatus as claimed in claim 1, which includes a cathode ray tube on which the outline is traced, a lens and film combination in front of the tube screen, and independent mechanical incremental stepping means for both the lens and the film, in which one scan-axis driver of the tube is connected to a lens servo which provides a supplementary electronic incremental adjustment for the lens, and the other scan-axis driver is connected to a film servo which provides a supplementary electronic incremental adjustment for the film.

8. Apparatus for producing a desired shape as a visible image, comprising a randomly addressable memory holding a sequential record of vector steps representative of incremental sections along the length of a predetermined curve which are grouped to represent a plurality of sections of said curve, means to address the memory for generating a series of vector step instructions matched to the outline of the desired shape to be reproduced, means for orientating the individual steps to produce a modified sequence of step instructions according to the desired re-orientation, further comprising means for generating from each input vector step two small steps at right angles to each other, and means responsive to said modified step instructions for defining the outline of the desired shape as a sequence of selected sections of said predetermined curve.

9. Apparatus as claimed in claim 8 including circuit means comprising random access data storage means and means to redistribute the stored data to control an incremental plotter to produce said pattern of parallel stripes in raster fashion within the defined outline.

10. Apparatus as claimed in claim 8 for the typesetting of typographic images, including a plotter in the form of a cathode ray tube, and wherein means are provided for obtaining a photographic record of displayed images, including a zone compression circuit connected to the output of the orientating means for compressing selected zones of an image outline.

11. Apparatus as claimed in claim 8 for the type setting of typographic images, including a plotter in the form of a cathode ray tube, and wherein means are provided for obtaining a photographic record of displayed images, and a weighting circuit is arranged to add vertical or horizontal steps to parts of the image outline.

12. A method of reproducing a character as a visible image comprising:

(a) storing incremental sections along the length of a predetermined master curve of fixed orientation as a series of vector step instructions in a randomly addressable memory;

(b) directly addressing the randomly addressable memory by a first counter which is preloaded to determine the starting position along the curve, and preloading a second counter connected in tandem with said first counter to determine the length of the given section;

(c) selecting appropriate ones of said stored curve sections to match the parameters of the outline of the character to be reproduced;

(d) re-orientating the individual selected sections to produce a modified sequence of step instructions according to the desired re-orientations; and (e) controlling an incremental plotter by said modified step instructions to trace a finely resolved sequential character outline.

13. A method as claimed in claim 12, used for typographic images, which includes vertically compressing selected zones of an image outline.

14. A method of producing a character as a visible image comprising:

(a) storing incremental sections along the length of a predetermined master curve of fixed orientation as a series of vector step instructions in a randomly addressable memory;

(b) selecting appropriate ones of said stored curve sections to match the parameters of the outline of the character to be reproduced;

(c) re-orientating the individual selection sections to produce a modified sequence of step instructions according to the desired re-orientation;

(d) taking four-vector re-orientation step instructions, generating eight-vector steps therefrom, and eliminating redundant excursions to smooth the curve sections;

(e) controlling an incremental plotter by said modified step instructions to trace a finely resolved sequential character outline.

15. A method of reproducing a character as a visible image comprising:

(a) storing incremental sections along the length of a predetermined master curve of fixed orientation as a series of vector step instructions in a randomly addressable memory;

(b) selecting appropriate ones of said stored curve sections to match the parameters of the outline of the character to be reproduced;

(c) re-orientating the individual selected sections to produce a modified sequence of step instructions according to the desired re-orientation;

(d) weighting certain vertical or horizontal elements of a character image by adding vertical or horizontal steps to parts of the image outline; and (e) controlling an incremental plotter by said modified step instructions to trace a finely resolved sequential character outline.

16. Apparatus for producing a desired shape as a visible image, comprising a randomly addressable memory holding a sequential record of vector steps representative of incremental sections along the length of a predetermined curve which are grouped to represent a plurality of sections of said curve, means to address the memory for generating a series of vector step instructions matched to the outline of the desired shape to be reproduced, means for orientating the individual steps to produce a modified sequence of step instructions according to the desire re-orientation, said orientating means further comprising means for generating from each input vector two small steps at right angles to each other, and including sine and cosine PROMs which are addressed by a bit number representative of the angle through which a selected section is to be rotated and which produce bit numbers which determine the sizes of said two small steps, and an adder circuit which receives the vector step instructions from the memory and also two bits from a tilt angle address to effect transposition of any given vector step through 90°, 180° or 270°, and means responsive to said modified step instruction for defining the outline of the desired shape as a sequence of selected sections of said predetermined curve.

17. Apparatus for producing a desired shape as a visible image, comprising a randomly addressable memory holding a sequential record of vector steps representative of incremental sections along the length of a predetermined curve which are grouped to represent a plurality of sections of said curve, means to address the memory for generating a series of vecotr step instructions matched to the outline of the desired shape to be reproduced, said means to address the memory further comprising an up/down counter preloaded to determine the starting position along the curve, a down-only counter being connected in tandem with said up/down counter and preloaded to determine the length of a given curve section, and means to effect reflection and reversal of a given curve section, means for orientating the individual steps to produce a modified sequence of step instructions according to the desired re-orientation, and means responsive to said modified step instructions for defining the outline of the desired shape as a sequence of selected sections of said predetermined curve.

18. A method of producing a desired shape as a visible image, comprising:

(a) storing a plurality of sections of a predetermined master curve of fixed orientation each as a series of incremental vector step instructions in a randomly addressable memory;

(b) directly addressing the randomly addressable memory by a first counter which is preloaded to determine the starting position along the curve, and preloading a second counter connected in tandem with said first counter to determine the length of a given section;

(c) selecting appropriate ones of said stored curve sections to match the parameters of the outline of the shape to be produced;

(d) re-orientating the individual selected sections to produce for each a modified series of step instructions according to the desired re-orientation; and (e) defining the outline of the desired shape based on said modified step instructions as a sequence of the selected curve sections.

19. A method producing a desired shape as a visible image, comprising:

(a) storing a plurality of sections of a predetermined master curve of fixed orientation each as a series of incremental vector step instructions in a randomly addressable memory;

(b) selecting appropriate ones of said stored curve sections to match the parameter of the outline of the shape to be produced;

(c) re-orientating the individual selected sections to produce for each a modified series of step instructions according to the desired re-orientation;

(d) taking four-vector re-orientated step instructions, generating eight-vector steps therefrom, and eliminating redundant excursions to smooth the curve sections; and (e) defining the outline of the desired shape based on said modified step instructions as a sequence of the selected curve sections.

20. Apparatus for producing a desired shape as a visible image, comprising a randomly addressable memory holding a sequential record of vector steps representative of incremental sections along the length of a predetermined curve which are grouped to represent a plurality of sections of said curve, means to address the memory for generating a series of vector step instructions matched to the outline of the desired shape to be reproduced, means for orientating the individual steps to produce a modified sequence of step instructions according to the desired re-orientation, means responsive to said modified step instructions for defining the outline of the desired shape as a sequence of selected sections of said predetermined curve, and means for generating a secondary outline immediately inside the character outline, said means further comprising an auxiliary PROM connected in tandem with said memory and storing the same curve information.

* * * * *